July 5, 1938.  A. H. LAUDER ET AL  2,123,055
METHOD OF STARTING ELECTRIC MOTORS
Filed May 6, 1936
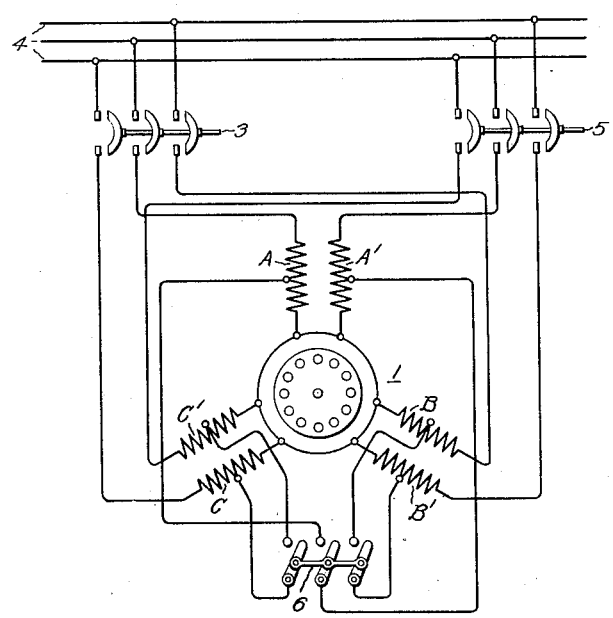
Inventors:
Arthur H. Lauder,
David R. Shoults,
by Harry E. Dunham
Their Attorney.

Patented July 5, 1938

2,123,055

UNITED STATES PATENT OFFICE 2,123,055

METHOD OF STARTING ELECTRIC MOTORS

Arthur H. Lauder and David R. Shoults, Schenectady, N. Y., assignors to General Electric Company, a corporation of New York Application May 6, 1936, Serial No. 78,181

5 Claims. (Cl. 172—280)

Our invention relates to a method of starting electric motors and particularly to a method of starting polyphase motors which are provided with a polyphase primary winding, each phase of which includes a plurality of winding sections.

Heretofore it has been the practice to start a polyphase motor which is provided with a polyphase primary winding each phase of which includes a plurality of winding sections by successively connecting the corresponding phase winding sections in parallel. For example, in a motor having two winding sections per phase, the motor has been started by first simultaneously energizing one winding section of each phase and then energizing all of the winding sections of each phase. In some cases, however, it is desirable to obtain a starting torque step between that value produced by energizing only one winding section of each phase and that value produced by simultaneously energizing both winding sections in each phase, and heretofore it has been difficult to obtain this additional torque step except by employing additional external apparatus, such as resistors or compensators.

One object of our invention is to provide a method of starting an electric motor whereby such additional torque steps may be obtained without the use of such additional external apparatus.

Our invention will better understood from the following description when taken in connection with the accompanying drawing, the single figure of which diagrammatically illustrates an arrangement of apparatus for carrying out our method of starting a motor, and its scope will be pointed out in the appended claims.

Referring to the drawing, I represents a three phase motor having a three phase primary winding each phase of which comprises a plurality of winding sections. One of these phases comprises the winding sections A and A'. Another phase comprises the winding sections B and B' and the third phase comprises the winding sections C and C'. These winding sections are arranged in any suitable manner, examples of which are well known in the art so that the motor starting current is materially less when only one of these winding sections of each phase is energized than it is when both winding sections of each phase are simultaneously energized. While we have shown a three phase motor, it is evident that our invention is applicable to motors having any number of phases. Also, in order to simplify the disclosure, we have shown only two winding sections for each phase, but it will be obvious that any desired number of winding sections may be provided for each phase of the motor primary winding.

As shown in the drawing, one terminal of each of the winding sections A, B and C is arranged to be connected by means of a suitable switch 3 to a three phase supply circuit 4 and one terminal of each of the other winding sections A', B', and C' is arranged to be connected by means of a suitable switch 5 to the three phase supply circuit 4. The other terminals of all of the winding sections are connected together so that when both of the switches 3 and 5 are closed the winding sections A and A' are connected in parallel to one phase conductor of the supply circuit 4, the windings B and B' are connected in parallel to another phase conductor of the supply circuit 4 and the windings C and C' are connected in parallel to the third phase conductor of the supply circuit 4.

In accordance with our invention, we also provide means for connecting a portion of each winding section in parallel with a corresponding portion of the other winding section of the same phase. As shown in the drawing, we have provided a switch 6 which when closed connects a portion of the winding section A in parallel with a portion of the winding section A' and a portion of the winding section B in parallel with a portion of the winding section B' and a portion of the winding section C in parallel with a portion of the winding section C'. The portions of the phase windings connected in parallel by the switch 6 depend upon the amount of additional torque desired.

When it is desired to start the motor shown in the drawing in accordance with our method, either the switch 3 or the switch 5 is closed. For the purpose of this description it will be assumed that the switch 3 is closed while the switches 4 and 6 remain open. The closing of the switch 3 energizes the winding sections A, B and C so that the motor develops substantially 50% of the full winding torque since the impedance of the winding sections A, B and C is about double the impedance of all of the winding sections connected in parallel. After the switch 3 is closed, the switch 6 is then closed to connect a portion of each of the unenergized winding sections A', B' and C', respectively, in parallel with a portion of the energized winding section of the same phase. This results in an increase in the motor torque which depends on the amount of the winding sections A', B', and C' connected in parallel with the energized winding sections A, B and C, respectively. If the switch 6 is arranged to connect substantially the midpoints of the winding sections A', B', and C' to the midpoints of the winding sections A, B, and C, respectively, the torque will be substantially 66⅔% of the full winding torque. Then when it is desired to establish the normal running connections, the switch 5 is closed so that the remaining portions of the winding sections A', B', and C' are respectively connected in parallel with the remaining portions of the energized winding sections A, B and C. The motor then develops to its full winding torque.

In case it is desired to have the motor develop substantially 66⅔% of its full winding torque instead of substantially 50% at the instant of starting the switch 6 is closed before or simultaneously therewith instead of after the switch 3 is closed.

While we have shown the switches 3, 5, and 6 as manually controlled devices, it will be obvious that they may be controlled in any well known manner, examples of which are well known in the art, so that they are respectively operated at the proper times during the starting operation of the motor.

While we have in accordance with the patent statutes shown and described a certain embodiment of apparatus whereby our improved method may be performed, changes and modifications will be obvious to those skilled in the art, and we aim, in the appended claims, to cover all such changes and modifications as fall within the true spirit and scope of our invention.

What we claim as new and desire to secure by Letters Patent in the United States is:

1. The method of starting an electric motor having a polyphase primary winding, each phase of which includes a plurality of winding sections, which consists in energizing one winding section of each phase, then connecting a portion of a second winding section of each phase in parallel with a portion of the energized winding section of the same phase, and then energizing another portion of said second winding section of each phase in parallel with another portion of said wholly energized winding section of the same phase without deenergizing any of said energized winding sections.

2. The method of starting an electric motor having a polyphase primary winding, each phase of which includes two winding sections, which consists in energizing one winding section of each phase, then connecting a portion of the other winding section of each phase in parallel with a portion of the energized winding section of the same phase, and then energizing another portion of each of said other winding section in parallel with another portion of said wholly energized winding section of the same phase without deenergizing any of the previously energized winding sections.

3. The method of starting an electric motor having a polyphase primary winding, each phase of which includes two winding sections, which consists in energizing one winding section of each phase, then connecting a portion of the other winding section of each phase in parallel with a portion of the energized winding section of the same phase, and then connecting the remaining portion of each of said other winding sections in parallel with the remaining portion of the wholly energized winding section of the source phase without interrupting the supply of current to any of the previously energized winding sections.

4. The method of starting an electric motor having a polyphase primary winding, each phase of which includes two winding sections which consists in simultaneously energizing one winding section of each phase and a portion of the second winding section of each phase in parallel with a portion of the wholly energized winding section of the same phase, and then connecting a greater portion of each of said second winding sections in parallel with a greater portion of said wholly energized winding section of the same phase without deenergizing any of the energized winding sections.

5. The method of starting an electric motor having a polyphase primary winding, each phase of which includes two winding sections which consists in simultaneously energizing one winding section of each phase and a portion of the second winding section of each phase in parallel with a portion of the wholly energized winding section of the same phase, and then connecting the whole of each of said second winding sections in parallel with the entire wholly energized winding section of the same phase without deenergizing any of the energized winding sections.

ARTHUR H. LAUDER.
DAVID R. SHOULTS.